United States Patent
Ansari et al.

(10) Patent No.: US 11,682,807 B2
(45) Date of Patent: Jun. 20, 2023

(54) CATHOLYTE FOR METAL-OXYGEN BATTERY

(71) Applicants: International Business Machines Corporation, Armonk, NY (US); REPSOL, S.A., Madrid (ES)

(72) Inventors: Younes Ansari, San Jose, CA (US); Young-Hye Na, San Jose, CA (US); Francisco José Alia Moreno-Ortiz, Madrid (ES)

(73) Assignees: International Business Machines Corporation, Armonk, NY (US); Repsol, S.A., Madrid (ES)

( * ) Notice: Subject to any disclaimer, the term of this patent is extended or adjusted under 35 U.S.C. 154(b) by 194 days.

(21) Appl. No.: 16/688,942

(22) Filed: Nov. 19, 2019

(65) Prior Publication Data

US 2021/0111453 A1    Apr. 15, 2021

(30) Foreign Application Priority Data

Oct. 10, 2019  (EP) .................................... 19382887

(51) Int. Cl.
| | | |
|---|---|---|
| H01M 8/22 | (2006.01) | |
| H01M 12/06 | (2006.01) | |
| H01M 8/023 | (2016.01) | |
| H01M 4/88 | (2006.01) | |
| H01M 4/38 | (2006.01) | |
| H01M 50/70 | (2021.01) | |

(52) U.S. Cl.
CPC ........... *H01M 12/06* (2013.01); *H01M 4/382* (2013.01); *H01M 4/8828* (2013.01); *H01M 8/023* (2013.01); *H01M 50/70* (2021.01); *H01M 2300/0042* (2013.01)

(58) Field of Classification Search
CPC ...... H01M 12/06; H01M 12/04; H01M 12/08; H01M 50/70; H01M 50/73; H01M 4/382; H01M 4/8828; H01M 8/023; H01M 8/0241; H01M 8/0232; H01M 8/0234; H01M 2300/0042
See application file for complete search history.

(56) References Cited

U.S. PATENT DOCUMENTS

| | | | |
|---|---|---|---|
| 8,673,477 B2 | 3/2014 | Visco et al. | |
| 8,940,446 B1 | 1/2015 | Holme et al. | |
| 9,368,775 B2 | 6/2016 | Visco et al. | |
| 2012/0301767 A1 | 11/2012 | Kim | |
| 2013/0337348 A1 | 12/2013 | Zheng et al. | |

(Continued)

FOREIGN PATENT DOCUMENTS

| | | | | |
|---|---|---|---|---|
| CN | 107403914 | * | 11/2017 | .............. H01M 4/36 |
| WO | 2017021840 A1 | | 2/2017 | |

OTHER PUBLICATIONS

Translation of CN 107403914, Bai et al., A Dry Mixing Technique of Artificial Graphite Cathode Paste; Nov. 28, 2017.*

(Continued)

*Primary Examiner* — Raymond Alejandro
(74) *Attorney, Agent, or Firm* — Karen Canaan; CanaanLaw, P.C.; H. Sanders Gwin, Jr.

(57) ABSTRACT

A metal-oxygen battery includes a catholyte with: (i) carbon black; and, (ii) at least one of graphite and graphene, wherein said at least one of graphite and graphene constitutes between 0 wt % and 30 wt % of the total carbon in the catholyte.

10 Claims, 5 Drawing Sheets

(56) References Cited

U.S. PATENT DOCUMENTS

| | | | | |
|---|---|---|---|---|
| 2015/0125763 A1* | 5/2015 | Zheng | ............... | H01M 4/96 429/405 |
| 2018/0183102 A1* | 6/2018 | Kim | ............... | H01M 12/08 |

OTHER PUBLICATIONS

Chen et al., "A High-Rate Rechargeable Li-Air Flow Battery", Journal of the Electrochemical Society, 160 (10) A1619-A1623 (2013), Published Jul. 25, 2013, 5 pgs.

Li et al., "Modeling study of a Li—O2 battery with an active cathode", Energy 81 (2015) 489-500, Available online Jan. 18, 2015, 12 pgs.

Rugger et al., "A novel concept of Semi-solid, Li Redox Flow Air (O2) Battery: a breakthrough towards high energy and power batteries", Electrochimica Acta 206 (2016) 291-300, Available online Apr. 26, 2016, 10 pgs.

Ruggeri et al., "Carbonaceous catholyte for high energy density semi-solid Li/O2 flow battery", Carbon 12797, Jan. 14, 2018, 25 pgs.

\* cited by examiner

US 11,682,807 B2

CATHOLYTE FOR METAL-OXYGEN BATTERY

This application claims the benefit of Spanish European Patent Organization (EPO) Application number 19382887.8, filed on Oct. 10, 2019, which is incorporated herein by reference in its entirety.

BACKGROUND

Rechargeable batteries are used as a power source in a wide range of applications such as, for example, industrial devices, medical devices, electronic devices, electric vehicles, and grid energy storage systems. Battery technology is continually being developed to enable higher energy density and greater efficiency, thereby permitting the use of batteries as power sources for additional applications.

Metal-oxygen batteries include a metal electrode such as, for example, Al, Mg, Zn, Li, Na, and K, as well as a gas mixture containing oxygen. For example, a lithium oxygen or lithium air battery has excellent performance due at least in part to the low atomic number, low density, and high reducing capability of elemental lithium. Moreover, a lithium-oxygen or lithium air battery could potentially have a theoretical specific energy three to five times greater than conventional lithium ion batteries.

In one example, a Li—$O_2$ battery includes a lithium metal foil anode, a condensed carbonaceous cathode as a host for oxygen gas and discharge products, a separator to avoid direct contact of anode and cathode, and an electrolyte to allow conduction of lithium ion between the two electrodes.

Condensed cathodes such as gas diffusion carbon electrodes can negatively affect battery operation. Drawbacks of condensed cathodes in Li—$O_2$ batteries can include cathode passivation with an insulating discharge product, slow $O_2$ mass transportation, and electrode thickness constraints. A semi-flow Li—$O_2$ battery, in which the condensed cathode is replaced with a mobile catholyte including an electrolyte and porous carbon particles, can feed the oxygen-rich catholyte onto the electrode and more effectively transport discharge products from the active electrode surface, which can improve the capacity and energy density of the Li$O_2$ flow battery compared to a Li$O_2$ battery with a condensed cathode.

SUMMARY

The electrical conductivity and morphology of the carbonaceous catholyte can play a role in the discharge and charge rate capability and battery capacity of a metal-oxygen flow battery. In general, the present disclosure is directed to a catholyte for a metal-$O_2$ battery that includes a slurry with an amorphous porous carbon and a second carbon source. The second carbon source includes crystalline planar carbon materials such as, for example, graphene and its derivatives such as graphite, reduced graphene oxide, and mixtures and combinations thereof. The catholyte including a slurry with a selected combination of amorphous porous carbon and crystalline planar carbon materials can increase the overall capacity and energy density of a Li—$O_2$ flow battery cell compared to a Li—$O_2$ flow battery cell including a catholyte slurry with amorphous porous carbon alone.

In one aspect, the present disclosure is directed to a metal-oxygen battery with a catholyte that includes: (i) carbon black; and, (ii) at least one of graphite and graphene, wherein said at least one of graphite and graphene constitutes between 0 wt % and 30 wt % of the total carbon in the catholyte.

In another aspect, the present disclosure is directed to a metal-oxygen battery, including:
  a metallic anode;
  a catholyte slurry contacting the metallic anode, wherein the catholyte slurry includes:
    an electrolyte, and
    a carbon composition including amorphous carbon and crystalline carbon,
    wherein the crystalline carbon constitutes less than about 50% of the carbon composition; and
  a current collector contacting the catholyte slurry.

In another aspect, the present disclosure is directed to a method of forming a metal oxygen battery, including:
  introducing an oxygen-containing gas into a cell, the cell including:
    a metallic anode selected from the group consisting of Al, Mg, Zn, Li, Si, Na, K, and mixtures and alloys thereof,
    a catholyte slurry contacting the metallic anode, wherein the catholyte slurry includes:
      an electrolyte, and
      a carbon composition including carbon black and a second carbon material selected from the group consisting of graphite, graphene, and mixtures and combinations thereof, wherein the second carbon material constitutes greater than about 0 wt % and up to about 30 wt % of the total carbon in the carbon composition;
    a current collector contacting the catholyte slurry; and
    a porous separator between the metallic anode and the current collector.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

Like symbols in the figures indicate like elements.

DETAILED DESCRIPTION

Figure 1:
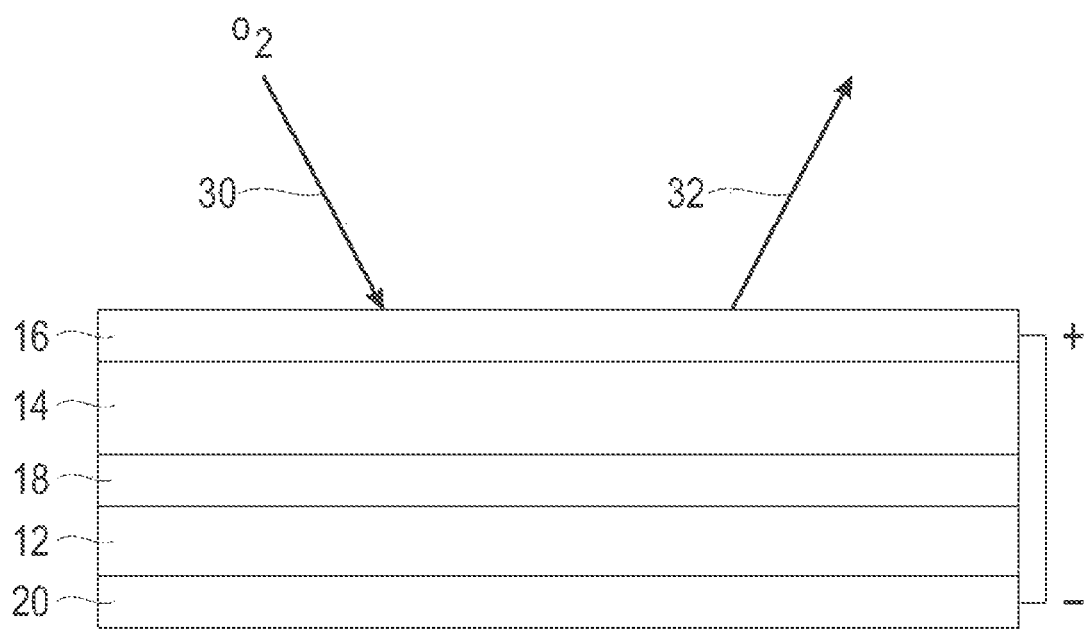
FIG. 1 is a conceptual diagram illustrating a cross-sectional view of an example metal oxygen flow battery including an anode, a catholyte, at least one current collector, and an optional separator.

FIG. 1 is a conceptual diagram illustrating an example metal oxygen flow cell battery 10. The battery 10 includes a metallic anode 12 and a catholyte slurry 14 that acts as a cathode for the battery. The catholyte slurry 14 includes an electrolyte and a carbon composition. The catholyte slurry 14 contacts an oxygen permeable current collector 16.

In some embodiments, the battery 10 includes an optional porous separator 18 between the metallic anode 12 and the current collector 16, as well as an optional current collector 20 contacting the metallic anode 12.

In discharging operation, when an oxygen-containing gas 30 enters the oxygen permeable current collector 16 and contacts the catholyte slurry 14, an oxidation reaction occurs at the metallic anode 12. A metal ion is released in the electrolyte, and an oxidation reduction reaction is induced in the catholyte slurry through the electron flow from the current collector 20 to the current collector 16. Residual gases 32 can also migrate from or be expelled from the current collector 16.

The metallic anode 12 may be made from any metal, and suitable examples include, but are not limited to, Al, Mg, Zn, Li, Na, and K, and mixtures and alloys thereof, as well as Si matrices impregnated with these metals such as, for example, lithiated Si. In some examples, the anode 12 consists essentially of elemental Li, Mg, Na or K, or any of Li, Mg, Na or K alloyed with one or more additional elements. In some embodiments, the anode 12 consists of elemental Li, Mg, Na, or K.

The anode 12 may take up metal ions from the electrolyte in the catholyte slurry 14 during charging, and release the metal ions to the electrolyte during discharging. In some embodiments, the anode 12 may be or include an intercalation host material capable of taking up the metal ions in the electrolyte of the catholyte slurry 14. In some examples, a solid electrolyte interphase (SEI) layer form on an exposed surface of the anode 12. For example, the SEI layer may include an oxide of a metal from the electrolyte in the catholyte slurry 14.

The electrolyte in the catholyte slurry 14 may be aqueous or non-aqueous. In some examples, the electrolyte may include one or more non-aqueous, organic solvents such as an ether, a glyme, a carbonate, a nitrile, an amide, an amine, an organosulfur solvent, an organophosphorus solvent, an organosilicon solvent, a fluorinated solvent, adiponitrile (ADN), propylene carbonate (PC), dimethoxyethane (DME), and mixtures and combinations thereof.

The electrolyte of the catholyte slurry 14 can include an optional salt that dissociates into a respective metal ion and a respective counter anion to promote ionic conductivity. In some examples, which are not intended to be limiting, the metal ion includes at least one of Li, Mg, Na, or K, and the counter anion includes one or more of nitrate ($NO_3^-$), hexafluorophosphate ($PF_6^-$), tetrafluoroborate ($BF_4^-$), bisoxalato borate ($BOB^-$), difluorooxalato borate ($DFOB^-$), trifluoromethanesulfonate ($TF^-$), and trifluorosulfonylimide ($TFSI^-$).

In some embodiments, the electrolyte can also include an optional additional metal halide salt (e.g., MX, where M is a metal element and X is a halogen element). In the metal oxygen flow battery 10, the metal halide of the electrolyte in the catholyte slurry 14 functions as a redox mediator to lower charging overpotential and to improve cycle life.

In some examples, which are not intended to be limiting, the halide ion in the electrolyte may include an ion of at least one of I, Br, Cl, or F (e.g., X may be I, Br, Cl, or F). In some embodiments, which are not intended to be limiting, the metal ion may include an ion of at least one of the metals in the metallic anode 12 such as, Li, Mg, Na or K (e.g., M may be Li, Mg, Na or K). In other examples, the metal halide may include elements other than I, Br, Cl, F, Li, Mg, and/or Na.

The catholyte slurry 14 further includes a carbon composition with a primary carbon source including an amorphous carbon material and at least one secondary carbon source including a crystalline carbon material. In various embodiments, the primary carbon source in the catholyte slurry 14 includes particles of an amorphous carbon material such as carbon black and porous glassy carbon, and mixtures and combinations thereof, that are dispersible in the solvent of the electrolyte. In some embodiments, the secondary carbon source includes crystalline forms of carbon including graphite, graphene, graphene oxide, and mixtures and combinations thereof, which are dispersible in the solvent of the electrolyte.

In various embodiments, the carbon composition of the catholyte slurry 14 includes greater than about 50 wt % of the primary amorphous carbon material and a less than about 50 wt % of the secondary crystalline carbon material, based on the total weight of the carbon composition in the catholyte slurry 14. For example, in some embodiments, the carbon composition includes greater than about 0 wt % and less than 30 wt % of the secondary crystalline carbon material, or greater than about 0 wt % and less than about 20 wt %, or greater than about 0 wt % and less than about 10 wt %, or greater than about 0 wt % and less than about 5 wt %, based on the total weight of the carbon composition in the catholyte slurry 14.

While not wishing to be bound by any theory, presently available evidence indicates that the crystalline structure of the secondary carbon materials such as graphite and graphene provides a significantly higher active surface area than amorphous porous carbon particles. The secondary carbon can also enhance electronic conduction between porous carbon particles, which can provide a pathway for electrons in the bulk of the slurry. In addition, the more ordered nature of the crystalline secondary carbon material can prevent particle agglomeration in the catholyte slurry 14. This high surface area, along with the highly conductive nature of the secondary crystalline carbon materials, can more efficiently promote transport of the ions in the electrolyte of the catholyte slurry 14 compared with a slurry having amorphous carbon particles alone.

The current collector 16 may include a material of suitable electrical conductivity that collects electrons generated by a redox reaction during discharge of battery 10, and provides a conductive path to an external electrical circuit to which battery 10 is connected. Similarly, during recharge of battery 10, the current collector 16 provides an electrical pathway between an external voltage source and the catholyte slurry 14 to supply voltage for another redox reaction to charge battery 10. In some examples, current collector 16 may include electrically conductive powders such as metal and/or carbon powders, woven or non-woven metal fibers, metal foam, woven or non-woven carbon fibers, or the like. Additionally, or alternatively, currently collector 16 may include stainless-steel mesh, aluminum (Al) mesh, nickel (Ni) foam, and/or carbon paper. For example, in one embodiment, the current collector 16 may include a stainless-steel mesh with carbon nanoparticles deposited thereon. As yet another example, current collector may be a porous material that is electrically conductive.

In other examples, the battery 10 may optionally include a dedicated cathode material in addition to oxygen in the catholyte slurry 14 that functions as the active cathode material and current collector 16. In some examples, which are not intended to be limiting, the dedicated cathode may include at least one of lithium cobalt oxide (LCO, e.g., $LiCoO_2$), nickel cobalt aluminum (NCA, e.g., $LiNi_xCo_y$-

$Al_2O_3$, $LiNi_{0.8}Co_{0.15}Al_{0.05}O_2$), lithium ion manganese oxide (LMO, e.g., $LiMn_2O_4$), lithium nickel manganese cobalt oxide (NMC, e.g., $LiNiMnCoO_2$), nickel cobalt manganese (NCM, e.g., $LiNi_xCo_yMn_zO_2$, $LiNi0_{.33}Co_{0.33}Mn_{0.33}O_2$) or lithium iron phosphate (LFP, e.g., $LiFePO_4$).

In some examples, the battery 10 includes an optional separator 18. The separator 18 may force electrons through an external electrical circuit to which battery 10 is connected such that the electrons do not travel through battery 10 (e.g., through the catholyte slurry 14 of battery 10), while still enabling the metal ions to flow through battery 10 during charge and discharge. In various embodiments, the separator 18 may be soaked with, be present within, be adjacent to, or be surrounded by the catholyte slurry 14. The separator 18 may include any electrically non-conductive material that prevents movement of electrons through battery 10 such that the electrons move through the external circuit instead. In various embodiments, which are not intended to be limiting, suitable materials for the separator 18 include glass, ceramic materials, non-woven fibers, polymer films, rubber, and mixtures and combinations thereof.

After forming the electrolyte solution, the carbon composition is dispersed, dissolved, or otherwise incorporated into the electrolyte solution to form the catholyte slurry 14.

In some embodiments, the separator 18 may be wetted with the catholyte slurry 14 by soaking, dipping, spraying and the like, such that the separator 18 includes about 1 $\mu L/cm^2$ to about 500 $\mu L/cm^2$, about 10 $\mu L/cm^2$ to about 250 $\mu L/cm^2$, or about 50 $\mu L/cm^2$ to about 100 $\mu L/cm^2$ of the catholyte slurry.

The separator 18 with the catholyte slurry 14 thereon may then be incorporated into a closed cell between the anode 12 and the current collector 16. In some embodiments, if the separator 18 is not used, the catholyte slurry may simply be added into the closed cell between the anode 12 and the current collector 16.

Once the catholyte slurry 14 is present between the anode 12 and the current collector 16, oxygen, or a gas including oxygen such as, for example, air, is introduced into the cell to make the battery 10. In some examples, which are not intended to be limiting, the concentration of the oxygen in an enclosed cell system may be between about 5 wt % and about 100 wt %, about 50 wt % and about 100 wt %, or about 80 wt % and about 100 wt %, of the total amount of gases within the battery.

The present disclosure will now be described with respect to the following non-limiting examples.

EXAMPLES

General Procedure for Cell Assembly

Figure 3:
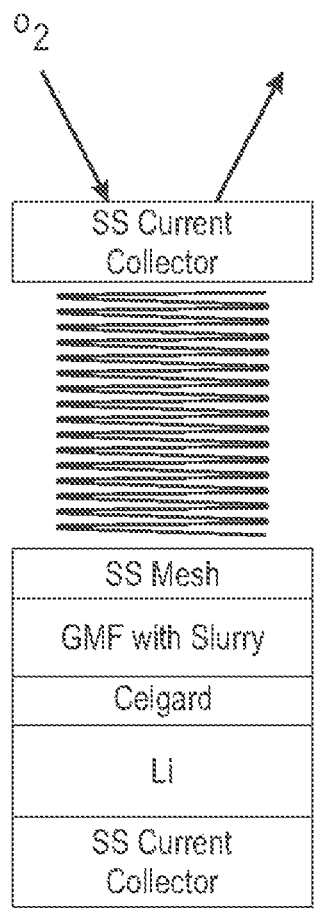
FIG. 3 is a schematic diagram of the Li—$O_2$ flow cell used in the examples below.

In-house prepared cells available from Swagelok of Solon, Ohio, under the trade designation SWAGELOK and shown schematically in FIG. 3 were used for all the tests described in the examples below. First, a 12 mm-diameter lithium foil covered with a separator available from Celgard LLC, Charlotte, N.C., under the trade designation CELGARD 2500 (same size) was placed on a stainless steel current collector (negative side) which was placed on the bottom part of the ½ inch (13 mm) cell and the fitting for the bottom part was closed (negative compartment).

The slurry (acting as electrolyte and cathode) was prepared in-situ in its own cell, dropping the proper amount of carbons and electrolyte followed by stirring. A total 4 mg of carbon(s) was deposited on the top of the separator, followed by the addition of 196 μl of an electrolyte (0.5 M LiTFSI in Tetraglyme) with a pipette, which was approximately 196 mg of the electrolyte. The selected 4 mg total carbon and 196 mg electrolyte provided a 2% carbon, 200 mg total slurry.

The electrolyte was also used to recover the residual carbon that might have been spread on the wall of the cell. To help slurry formation, the carbon(s) and electrolyte mixture were stirred mechanically using a magnetic stir bar within the cell.

A stainless steel mesh was placed on the slurry to assure transversal conductivity, which was connected to the positive stainless steel current collector through a spring to assure electrical contact. The top part of the cell was then closed, and the resulting cell was used for electrochemical testing. The active area of the cell was about 0.79 $cm^2$.

In all cells lithium foil was used as the anode, Celgard 2500 is used as a protecting layer and separator and, a stainless-steel (SS) mesh and a SS spring were used as cathode current collectors.

In the examples blow, various catholyte slurries were tested in identical $Li-O_2$ battery cells using 2 wt % of carbon in the slurry.

Example 1

Cell Containing 70% SuperP and 30% Graphite

The cell was assembled by following the general procedure set forth above. For carbon slurry formation, 2.8 mg of a conductive carbon black available from Imerys Graphite and Carbon Switzerland SA, Bodio, Switzerland, under the trade designation SuperP, and 1.2 mg of graphite, obtained from MTI Corp., Richmond, Calif., under the trade designation EQ-Lib-CGP, were added. The cell showed specific capacity of 0.31 $mAh/cm^2$.

Example 2

Cell Containing 80% SuperP and 20% Graphite

The cell was assembled by following the general procedure mentioned above. For carbon slurry formation, 3.2 mg of Super P and 0.8 mg of EQ-Lib-CGP graphite were added. The cell showed specific capacity of 1.4 $mAh/cm^2$.

Example 3

Cell Containing 90% SuperP and 10% Graphite

The cell was assembled by following the general procedure mentioned above. For carbon slurry formation, 3.6 mg of Super P and 0.4 mg of EQ-Lib-CGP graphite were added. The cell showed specific capacity of 0.29 $mAh/cm^2$.

Example 4

Cell Containing 80% SuperP and 20% Reduced Graphene Oxide

The cell was assembled by following the general procedure mentioned above. For carbon slurry formation, 3.2 mg of SuperP and 0.8 mg of reduced graphene oxide (RGO) obtained from University Wafer, Inc., Boston, Mass., were added. The cell showed specific capacity of 0.62 $mAh/cm^2$.

Example 5

Cell Containing 90% SuperP and 10% Reduced Graphene Oxide

The cell was assembled by following the general procedure mentioned above. For carbon slurry formation, 3.6 mg of SuperP and 0.4 mg of the reduced graphene oxide (RGO) were added. The cell showed specific capacity of 3.2 mAh/cm$^2$.

Comparative (Non-Working) Example 1

Cell Containing 100% SuperP

The cell was assembled by following the general procedure mentioned above. For carbon slurry formation, 4.0 mg of SuperP was added. The cell showed specific capacity of 0.10 mAh/cm$^2$.

Comparative (Non-Working) Example 2

Cell Containing 50% SuperP and 50% Graphite

The cell was assembled by following the general procedure mentioned above. For carbon slurry formation, 2.0 mg of SuperP and 2.0 mg of graphite were added. The cell showed specific capacity of 0.059 mAh/cm$^2$.

Comparative (Non-Working) Example 3

Cell Containing 60% SuperP and 40% Graphite

The cell was assembled by following the general procedure mentioned above. For carbon slurry formation, 2.4 mg of SuperP and 1.6 mg of graphite were added. The cell showed a specific capacity of 0.005 mAh/cm$^2$.

Figure 2A:
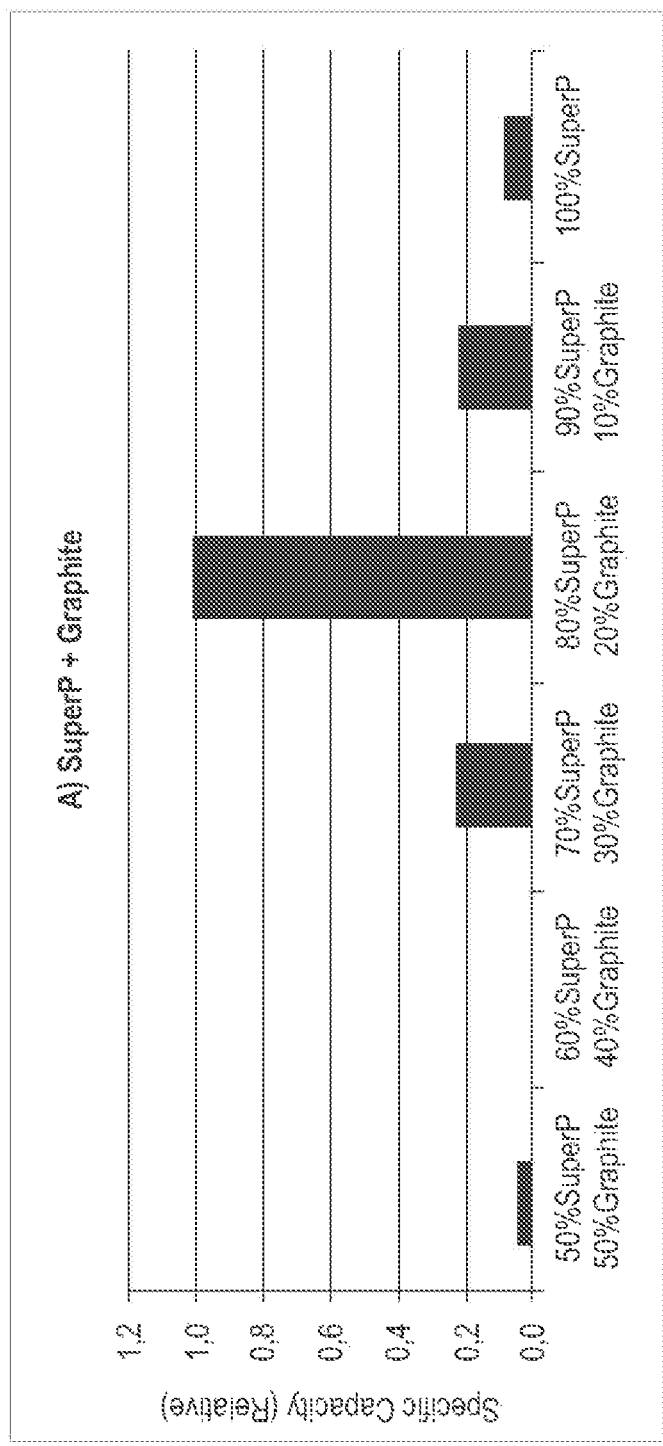
FIG. 2A is a plot of the specific capacity versus carbon composition of different catholytes in the Li—$O_2$ flow cell in the examples below, wherein the carbon composition includes carbon black and graphite.
Figure 2B:
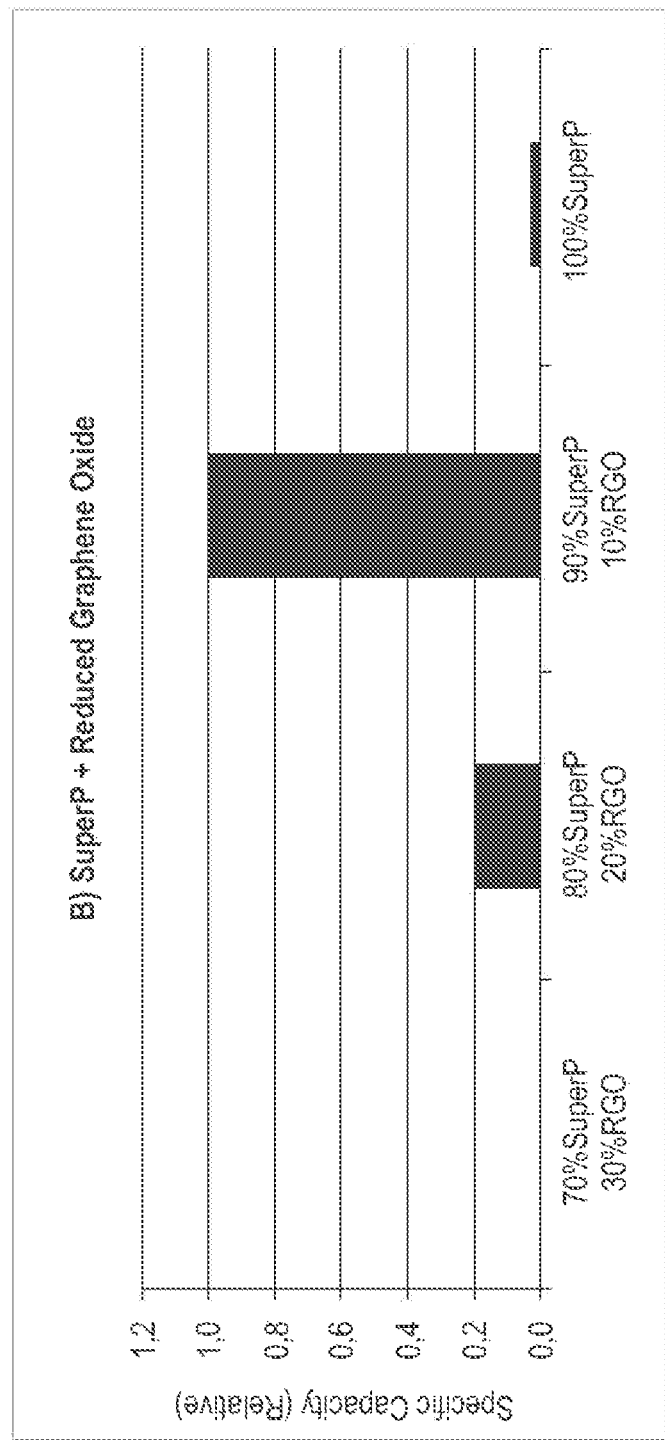
FIG. 2B is a plot of the specific capacity versus carbon composition of different catholytes in the Li—$O_2$ flow cell of the examples below, wherein the carbon composition includes carbon black and reduced graphene oxide (RGO).

FIGS. 2A-2B compare the specific capacity, expressed as relative to the maximum capacity shown in the figure, of Li—O$_2$ semi-flow cells with catholytes having various carbon contents as described in the examples above.

As shown in FIGS. 2A-2B, catholyte slurries with mixture of SuperP and graphene derivatives showed much higher energy density values compared to single carbon slurry (100% super P) under a certain range of weight ratios.

Referring to FIG. 2A, the carbon-containing catholyte slurries containing about 10 wt % to about 30 wt % of graphite demonstrated improved energy density compared to pure Super P or other mixtures containing higher graphite contents.

Referring to FIG. 2B, a similar trend in energy density enhancement was observed with the addition of reduced graphene oxide in the range of about 10 wt % to about 20 wt %.

The combination of the primary carbon source carbon black and a secondary carbon source chosen from crystalline graphene derivates graphite and reduced graphene oxide in an appropriate ratio can improve the energy density of a metal oxygen semi-flow battery.

Comparative (Non-Working) Example 4

Cell Assembled with a Condensed, Solid-Phase Carbon Electrode with 75% Super P and 25% Graphite To verify the effect of graphene derivative addition to the carbon catholyte slurry in a Li—O$_2$ flow cell, the performance of the condensed, solid-phase carbon electrode comprised of a carbon mixture that has a similar composition used in the catholyte slurries described in this invention (75% Super P and 25% Graphite) was investigated in a conventional Li—O$_2$ battery cell and compared with the cell made of the condensed carbon electrode comprising 100% Super P.

Condensed, solid-phase electrodes were fabricated by mixing the carbons with a polytetrafluoroethylene (PTFE) binder to form free-standing electrodes.

Figure 4:
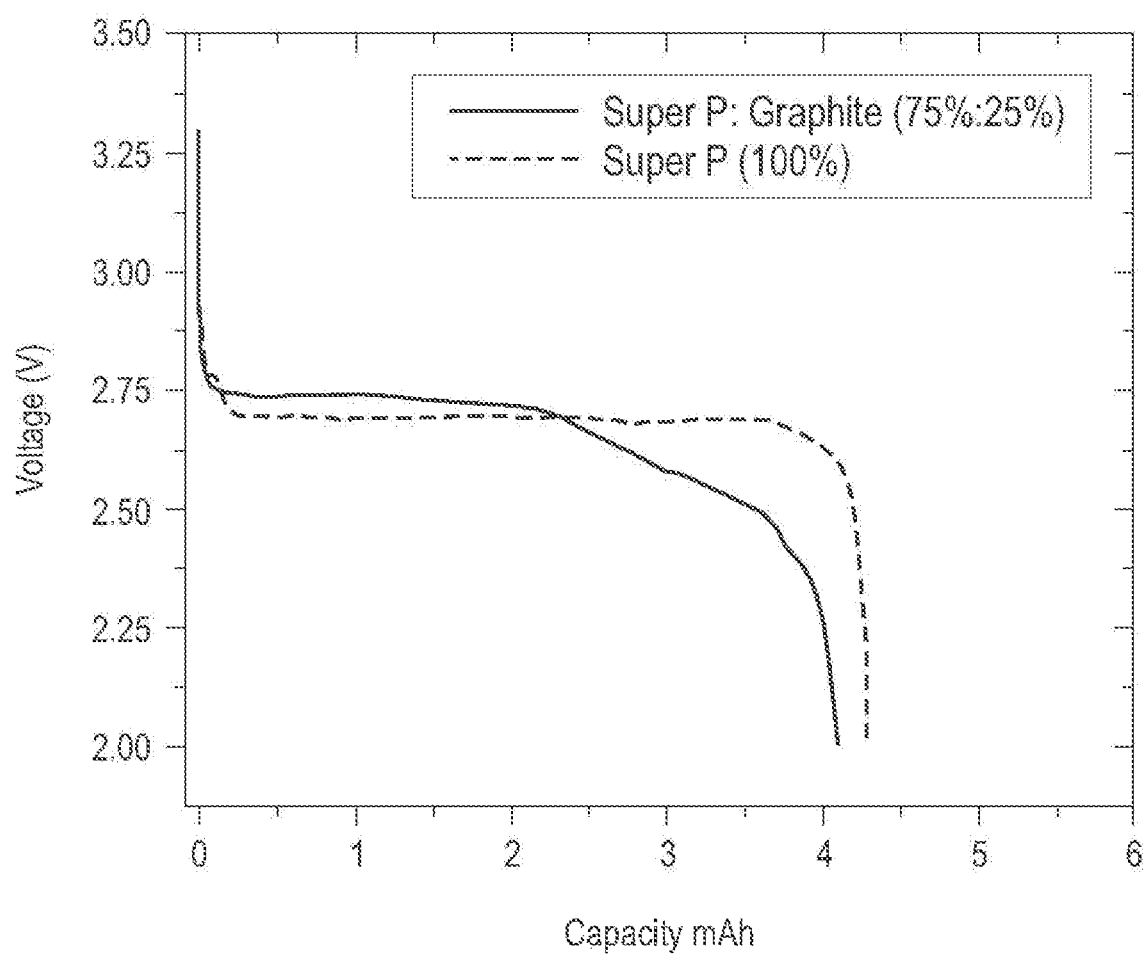
FIG. 4 is a plot of the specific capacity of a condensed electrode made from a combination of carbon black and graphite in a Li—$O_2$ compared to the specific capacity of a condensed electrode made from carbon black.

FIG. 4 shows that the effect of the graphene derivative carbon additive is absent in a condensed, solid-phase electrode, which can be attributed to a significant change in the morphology of the carbon host as a result of the forced compression during electrode fabrication. This change in the morphology causes a significant loss of capacity due to the loss of carbon active surface area and reduction in the amount of the active carbon (SuperP) material, 75% in the carbon mixture of this test versus 100% in the typical electrode.

The result presented in FIG. 4 provides further evidence of the positive effect of the crystalline carbon additives such as graphite and graphene that occurs on metal-oxygen and metal-air flow cells when the mixed-carbon cathode was formulated in a slurry form.

Various embodiments have been described. These and other embodiments are within the scope of the following claims.

What is claimed is:

1. A metal-oxygen battery, comprising:
a metallic anode comprising an exposed surface;
a catholyte slurry contacting the metallic anode, the catholyte slurry comprising:
an electrolyte comprising a metal element, and
a carbon composition comprising amorphous carbon and crystalline carbon, wherein the crystalline carbon constitutes greater than 0% and less than about 50% of the carbon composition;
a solid electrolyte interphase (SEI) layer on the exposed surface of the metallic anode, wherein the SEI layer comprises an oxide of the metal element from the electrolyte in the catholyte slurry; and
a current collector contacting the catholyte slurry.

2. The battery of claim 1, wherein the crystalline carbon is selected from the group consisting of graphite, graphene, and mixtures and combinations thereof, and wherein the crystalline carbon constitutes up to about 30 wt % of the total carbon in the carbon composition.

3. The battery of claim 1, wherein the current collector comprises an electrically conductive porous material.

4. The battery of claim 1, further comprising a separator between the anode and the current collector.

5. The battery of claim 1, wherein the metallic anode is selected from the group consisting of Al, Mg, Zn, Li, Si, Na, K, and mixtures and alloys thereof.

6. The battery of claim 1, wherein the metallic anode is selected from the group consisting of Li, Na, Mg, and mixtures and alloys thereof.

7. The battery of claim 6, wherein the metallic anode is Li.

8. The battery of claim 1, wherein the electrolyte comprises a salt that dissociates into a respective metal ion and a respective counter anion, wherein:
(i) the metal ion is selected from the group consisting of Li, Mg, and Na, and mixtures and combinations thereof, and
(ii) the anion is selected from the group consisting of nitrate (NO3−), hexafluorophosphate (PF6−), tetrafluoroborate (BF4−), bisoxalato borate (BOB−), and difluorooxalato borate (DFOB−), trifluoromethanesulfonate (TF−), trifluorosulfonylimide (TFSI−), and mixtures and combinations thereof.

9. The battery of claim 8, wherein the electrolyte comprises a metal halide redox mediator that dissociates into a respective halide ion and a respective metal ion in the solvent, and wherein:
  (i) the halide ion comprises an ion of at least one of I, Br, Cl, and F, and
  (ii) the metal ion comprises an ion of at least one of Li, Mg, and Na.

10. The battery of claim 1, wherein the electrolyte comprises a solvent selected from the group consisting of an ether, a glyme, a carbonate, a nitrile, an amide, an amine, an organosulfur solvent, an organophosphorus solvent, an organosilicon solvent, a fluorinated solvent, and mixtures and combinations thereof.

* * * * *